(12) United States Patent
Aboubakr et al.

(10) Patent No.: US 11,853,783 B1
(45) Date of Patent: Dec. 26, 2023

(54) IDENTIFYING HOSTS FOR DYNAMICALLY ENABLING SPECIFIED FEATURES WHEN RESUMING OPERATION OF A VIRTUAL COMPUTE INSTANCE

(71) Applicant: Amazon Technologies, Inc., Seattle, WA (US)

(72) Inventors: Mohamed A Aboubakr, Issaquah, WA (US); Deepak Bhardwaj, Seattle, WA (US); Elton Victor Pinto, Seattle, WA (US); Ziran Nie, Seattle, WA (US); Akshay Bharat Shah, Redmond, WA (US); Ayush Jitendra Sanghvi, Seattle, WA (US); Michael A Ibarra, Everett, WA (US); Venkat Srinath Vutphala, Bothell, WA (US); Shivanischal Anand, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 17/216,482

(22) Filed: Mar. 29, 2021

(51) Int. Cl.
*G06F 9/455* (2018.01)

(52) U.S. Cl.
CPC ...... *G06F 9/45545* (2013.01); *G06F 9/45558* (2013.01); *G06F 2009/4557* (2013.01); *G06F 2009/45562* (2013.01); *G06F 2009/45575* (2013.01)

(58) Field of Classification Search
CPC ............... G06F 9/45545; G06F 9/4555; G06F 2009/45562; G06F 2009/4557; G06F 2009/45575
See application file for complete search history.

(56) References Cited

U.S. PATENT DOCUMENTS

| | | | |
|---|---|---|---|
| 9,323,547 | B2 | 4/2016 | Jayamohan |
| 9,361,145 | B1* | 6/2016 | Wilson ..................... G06F 13/28 |
| 9,928,099 | B1* | 3/2018 | Surani ................. H04L 41/0897 |
| 10,877,851 | B2 | 12/2020 | Mitkar et al. |
| 2012/0151476 | A1* | 6/2012 | Vincent .................. G06F 9/4856 718/1 |
| 2012/0227038 | A1* | 9/2012 | Hunt .................... G06F 9/45558 718/1 |
| 2015/0248305 | A1* | 9/2015 | Shu ........................ G06F 9/5077 718/1 |
| 2016/0283513 | A1* | 9/2016 | Antony ............... G06F 9/45545 |
| 2019/0310880 | A1 | 10/2019 | Gupta et al. |

(Continued)

OTHER PUBLICATIONS

U.S. Appl. No. 16/442,325, filed Jun. 14, 2019, Diwakar Gupta et al.

(Continued)

*Primary Examiner* — Dong U Kim
(74) *Attorney, Agent, or Firm* — S. Scott Foster; Kowert, Hood, Munyon, Rankin & Goetzel, P.C.

(57) ABSTRACT

Host systems for resuming operation of a virtual compute instance may be identified that support features enabled for the virtual compute instance. Virtual compute instance features may be enabled at runtime prior to a virtual compute instance being stopped. When a virtual compute instance is started again, these features may be used to identify a host system that supports at least these features so that when the virtual compute instance resumes operation on the identified host, the features can be enabled.

20 Claims, 10 Drawing Sheets

(56) References Cited

U.S. PATENT DOCUMENTS

| | | | |
|---|---|---|---|
| 2019/0361728 A1* | 11/2019 | Kumar | G06F 12/1009 |
| 2021/0034401 A1* | 2/2021 | Kletzander | G06F 9/4843 |
| 2021/0073020 A1* | 3/2021 | Zhu | H04L 49/70 |
| 2021/0173684 A1* | 6/2021 | Arcangeli | G06F 9/45558 |

OTHER PUBLICATIONS

U.S. Appl. No. 14/860,705, filed Sep. 21, 2015, Mihir Surani, et al.
U.S. Appl. No. 15/587,355, filed May 4, 2017, Joshua Burgin et al.

* cited by examiner

US 11,853,783 B1

IDENTIFYING HOSTS FOR DYNAMICALLY ENABLING SPECIFIED FEATURES WHEN RESUMING OPERATION OF A VIRTUAL COMPUTE INSTANCE

BACKGROUND

The advent of virtualization technologies for commodity hardware has provided benefits with respect to managing computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

Figure 1:
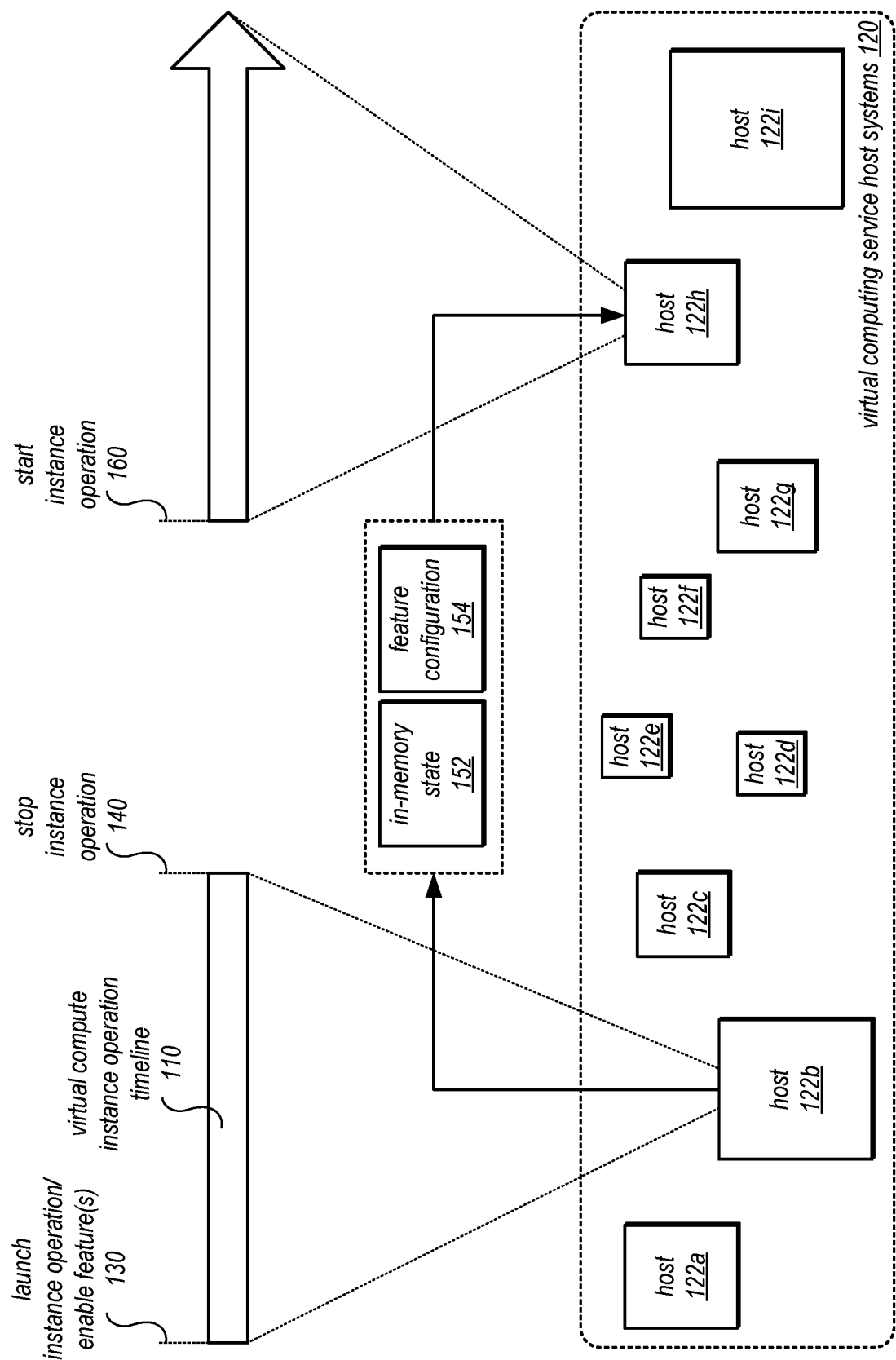
FIG. 1 is a logical block diagram illustrating identifying hosts for dynamically enabling specified features when resuming operation of a virtual compute instance, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for identifying hosts for dynamically enabling specified features when resuming operation of a virtual compute instance are described herein. A virtual computing service may supply clients, operators, or other customers with access to and/or control of one or more virtual computing resources. These resources may include various types of computing systems or devices configured for communication over a network. For example, in some embodiments, a virtual computing service may provide virtual computing resources to clients, users, or other type of customers, in the form of virtual compute instances (e.g., a virtual machine acting as a distinct logical computing system that provides users with the illusion that they are the sole operators and administrators of a given hardware computing resource). Users of virtual computing service may obtain, access, or otherwise use virtual compute instances to perform various functions, services, techniques, and/or applications.

As part of using virtual machines, the virtual computing service may provide an interface that allows various features to be enabled for a virtual compute instance. For example, enabled features may include various operating system, application, or other software patches, driver versions, configuration parameters, optimizations, packages, or other features that can be enabled or disabled via a request to the virtual computing service for a virtual compute instances. For example, processor features such as hyper-threading can be enabled or disabled according to features. These enabled features may allow for a customized execution environment or experience for a virtual compute instance. New features may be added, old features may be disabled, or other changes to the features supported for virtual compute instances may be implemented by the virtual computing service.

A virtual computing service may also provide various operational controls for using a virtual compute instance, in various embodiments. For example, various commands, requests, or other instructions may be received at the virtual computing service to launch or shutdown a virtual compute instance. In some scenarios, a virtual compute instance may not need to be used or available at all times. In such scenarios, a hibernation request or other request that causes operation of the virtual compute instance to be stopped may be implemented by the virtual computing service. The in-state memory of the virtual compute instance (e.g., the various data utilized by the virtual compute instance for currently executing applications) may be persistently stored, allowing a current host system for the virtual compute instance to be relinquished. In this way, a workload or other operation of a virtual compute instance may be suspended without a loss of progress for the various operations or tasks being performed by the virtual compute instance and subsequently may be quickly resumed.

For virtual compute instances that have various features enabled, identifying hosts for dynamically enabling specified features when resuming operation of a virtual compute instance may allow for the quick resume performance that hibernation offers without losing support for enabled features and enables the features as part of resuming operation. When virtual compute instances resume operation after hibernation, a different host system may be used (e.g., as the prior host system may be unavailable to host the virtual compute instance). Instead, a new host system may be identified that supports the features enabled before hibernation and can thus be configured to dynamically enable the features for the virtual compute instance when resuming operation. Preserving enabled features across hibernation can prevent hibernation operations from causing performance degradation, failures, and the like, and thus improves the performance of computing systems by improving both the resumption of operation of a virtual compute instance and preserves the performance benefits obtained by enabling features for the virtual compute instance. Moreover, such techniques may support ensuring that a resumed virtual compute instance may execute at least as well as it did prior to hibernation.

FIG. 1 is a logical block diagram illustrating identifying hosts for dynamically enabling specified features when resuming operation of a virtual compute instance, according to some embodiments. Timeline 110 illustrates the operation of a virtual compute instance of a virtual computing service. As discussed in detail below with regard to FIG. 2, various types of virtualized computing resources, such as virtual machines, may be hosted by a virtual computing service and provided for the performance of various systems, applications, operations, services, or tasks. A virtual computing service may offer many different types of host systems 120 to support different hardware, software, virtualization management, or other characteristics which may, in turn, result in the different features being supported by various host systems. For example host 122*a* may support different features than host 122*b*, 122*c*, 122*d*, 122*e*, 122*f*, 122*g*, 122*h*, 122*i*, and so on.

When at the launch of a virtual compute instance, various features may be enabled, as indicated at 130. For example, a launch instance request, command, or other instruction may be received at the virtual computing service which may specify or indicate which features are to be enabled when the virtual compute instance starts operation (e.g., at runtime). A host for the virtual compute instance may be chosen, such as host 122*b*. Host 122*b* may be selected in view of its support of the enabled features specified when a request to launch the instance is received, in some embodiments.

As indicated at 140, a request to stop operation 140 of the virtual compute instance may be received. The request may be validated, in some embodiments, to check that support for stopping the instance was enabled when the virtual instance was started. The request to stop operation 140 may cause a suspend-to-disk (sometimes referred to as hibernation) or other operation to be performed that causes an in-memory state 152 to be persistently stored separate from the host system (e.g., in a separate storage service, such as block-based storage service 220 in FIG. 2 along with data volume(s) for the virtual compute instance) along with any other information that may be used to resume and start operation of the virtual compute instance as of the stop operation (e.g., various networking configuration, attached storage, etc.). Storing the in-memory state 152 allows for resumption of the virtual compute instance according to the in-memory state (e.g., by continuing processes from the point of the stop operation instead of restarting process from a beginning or earlier state, providing the effect of pausing and unpausing the virtual compute instance). For example, in-memory state 152 may include various process or thread data stored in memory pages as well as various state information for indicating the current step and state of a set of instructions being executed. In-memory state 152 may include information for various layers of a software stack, such as information indicative of current operating system information, application information, device driver information, or other software executing as part of a compute instance.

Feature configuration 154 may also be stored separate from host 122*b*, in some embodiments. Feature configuration 154 may include the various features that are enabled for the virtual computing instance, which can be subsequently used to identify a new host, such as host 122*h*, which can support the enabled features in order to resume operation of the virtual compute instance. For example, as discussed in detail below with regard to FIGS. 3-9, in some embodiments feature configuration 154 may encode various features as a bitmap in order to support performant bitwise operations, such as "AND", to quickly compare and identify hosts 120 that support the features enabled for the virtual compute instance, allowing them to be enabled for the virtual compute instance upon start.

As indicated at 160, a request to start (or resume) instance operation may be received, as indicated at 160. To start instance operation a new host may be identified. In order to determine which host should be selected for the virtual computing instance, feature configuration 154 may be used to filter or otherwise exclude those hosts that do not support the enabled features (e.g., host 122*e*, host 122*d*, or host 122*f*), as discussed in detail below with regard to FIGS. 5 and 7. In some embodiments, a selected host may support more than the enabled features (e.g., where additional features are supported but not enabled for the virtual compute instance). Starting operation at the selected host (e.g., host 122*h*) may include, but not be limited to, enabling the features identified as enabled by feature configuration 154 (e.g., by setting various parameters, flags, or other control variables to enable the features), loading the in-memory state 154 into a memory of the host for the virtual compute instance, attaching or obtaining access for the host system to any persistent storage storing data for the virtual compute instance (e.g., by a establishing a network connection with a remote data store host a block-based device for the virtual compute instance), and resuming process(es).

Requests to start instance operation 160 or instructions to cause the instance to start operation may be implemented as part of various features or workflows for managing virtual compute instances, such as various migration techniques. Migration refers to moving virtual machine instances (and/or other resources) between hosts in a cloud computing network, or between hosts outside of the cloud computing network and hosts within the cloud. There are different types of migration including live migration and reboot migration. Techniques for various types of migration involve managing the critical phase—the time when the virtual machine instance is unavailable to the customer—which should be kept as short as possible.

During a reboot migration, the customer experiences an outage and an effective power cycle of their virtual machine instance. For example, a control plane service can coordinate a reboot migration workflow that involves tearing down the current domain on the original host (the "source host") and subsequently creating a new domain for the virtual machine instance on the new host (the "target host"). The instance is rebooted by being shut down on the original host and booted up again on the new host.

Live migration refers to the process of moving a running virtual machine instance between different physical machines without significantly disrupting the availability of the virtual machine instance (e.g., the down time of the virtual machine instance is not noticeable by the end user). When the control plane initiates a live migration workflow it can cause the creation of a new "inactive" domain associated with the instance on a target host, while the original domain for the instance continues to run as the "active" domain on the source host. Memory (including any in-memory state of running applications), storage, and network connectivity of the virtual machine are transferred from the original host with the active domain to the destination host with the inactive domain. For example, a local migration manager running on the source can send memory pages to the target host (also referred to as the "state" of the instance), track changes to the memory pages, and continue sending the changed pages to the target host. The instance may be briefly paused to prevent state changes while transferring a final set of memory contents to the target host. Thereafter, one or more of the control plane, the local migration manager, and the hypervisors (on the source and target hosts) can transition the inactive domain to become the active domain and demote the original active domain to become the inactive domain (sometimes referred to as a "flip"), after which the instance begins running on the target host, and the inactive domain can be discarded. Additional details relating to virtual machine instance migration are provided in U.S. application Ser. No. 16/442,325 (U.S. Pat. App. Pub. No. 2019/0310880), titled "MANAGED ORCHESTRATION OF VIRTUAL MACHINE INSTANCE MIGRATION," which is incorporated herein by reference in its entirety.

Please note that previous descriptions are not intended to be limiting, but are merely provided as an example of a virtual compute instance and host systems. For example, different numbers of host systems, different other management components, such as a control plane discussed in FIG. 2, or other features may be implemented as part of identifying hosts for dynamically enabling specified features when resuming operation of a virtual compute instance.

The specification next includes a general description of a provider network, which may perform identifying hosts for dynamically enabling specified features when resuming operation of a virtual compute instance. Then various examples of a provider network are discussed, including different components/modules, or arrangements of components/module that may be employed as part of implementing a provider network. A number of different methods and techniques to implement identifying hosts for dynamically enabling specified features when resuming operation of a virtual compute instance are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
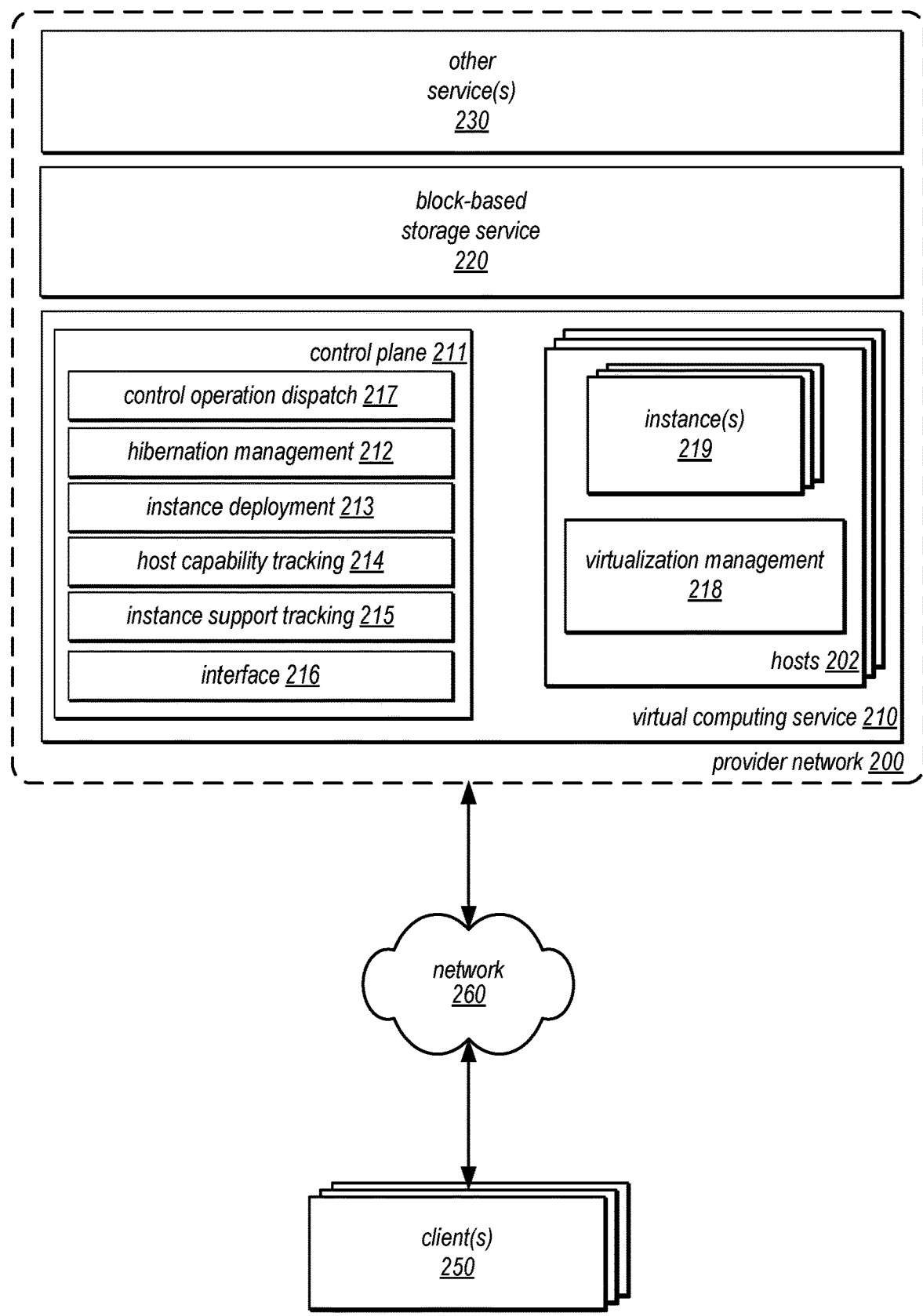
FIG. 2 is a logical block diagram illustrating a provider network that implements different services including a virtual computing service that implements identifying hosts for dynamically enabling specified features when resuming operation of a virtual compute instance, according to some embodiments.

FIG. 2 is a logical block diagram illustrating a provider network that implements different services including a virtual computing service that implements identifying hosts for dynamically enabling specified features when resuming operation of a virtual compute instance, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As noted above, provider network 200 may implement various computing resources or services, such as a virtual compute service 210, block-based storage service 220, and other service(s) 230 which may be any other type of network based services, including various other types of storage (e.g., database service or an object storage service), data processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual computing service 210 may offer virtualized computing resources (e.g., virtual compute instances) and according to various configurations for client(s) 250 operation. For example, various host systems 202 (e.g., computing system 1000 in FIG. 10), which may offer different capabilities and features for hosted virtual computes instances, may serve as hosts for one or more virtual compute instance(s) 219. Hosts 202 may implement virtualization management 218 to support and/or otherwise provide the execution framework to host instances and may include, for example, various different hypervisors or other virtualization software, firmware, and/or hardware that can host virtual compute instances (e.g., virtual machines). Virtualization management 218 may implement the workflows, tasks, or other operations to handle virtual compute instance management requests, including, but not limited to start, stop, pause, and resume.

In various embodiments, virtual compute instance(s) 219 may be implemented with a specified computational capacity (which may be specified by indicating the type and number of CPUs, the main memory size, and so on) and a specified software stack (e.g., a particular version of an operating system, which may in turn run on top of a hypervisor). Hosts 202 may be a number of different types of computing devices, used singly or in combination, to host the virtual compute instances 219, including general purpose or special purpose computer servers, storage devices, network devices and the like. In some embodiments client(s) 250 or other any other user may be configured (and/or authorized) to direct network traffic to a virtual compute instance 219.

In one embodiment, each of the virtual compute instances 219 may correspond to one of several instance families. An instance family may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance family can have a specific ratio of processing, local storage, memory, and networking resources, and different instance families may have differing types of these resources as well. Multiple sizes of these resource configurations can be available within a given instance family, referred to as "instance types." Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

Virtual compute instances 219 may operate or implement a variety of different frameworks, such as application server instances, general purpose or special-purpose operating systems, platforms that support various interpreted or compiled programming languages such as Ruby, Perl, Python, C, C++ and the like, or high-performance computing platforms) suitable for performing client(s) 250 applications, without, for example, requiring the client(s) 250 to access an instance. Applications (or other software operated/implemented by a virtual compute instance 219 and may be specified by client(s), such as custom and/or off-the-shelf software.

In some embodiments, virtual compute instances 219 may have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a virtual compute instance 219 for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires a virtual compute instance 219 to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances 219, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances 219 with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of virtual compute instances 219 may also include their location, in a particular data center, availability zone, geographic, location, etc. . . . and (in the case of reserved compute instances) reservation term length.

Virtual computing service 210 may implement control plane 211, which may include various features to manage hosts 202 and instance(s) 219 on behalf of client(s) 250, in some embodiments. For example, control plane 211 may implement various performance monitoring to ensure performance guarantees for instance(s), such as those specified by Service Level Agreements (SLAs) are met. Control plane 211 may also implement a management interface 216, which may support various operations to configure or enable features, deploy, start, stop, pause, resume, or other controls for instance(s) 219. Control operation dispatch 217 may implement various workflows or invoke various microservices (not illustrated). Control plane 211 may also support various features related to implementing hibernation techniques, as discussed in detail below with regard to FIGS. 3-6, including hibernation management 212, instance deployment 213, host capability tracking 214, and instance support tracking 215.

Interface 216 may include various types of interfaces, such as a command line interface, graphical user interface, and/or programmatic interface (e.g., Application Programming Interfaces (APIs)) in order to perform requested operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Provider network 200 may also implement block-based storage service 220, in various embodiments, for performing storage operations. Block-based storage service 220 may be a storage system that provides block level storage for storing one or more sets of data volumes of data that may be mapped to particular clients (e.g., a virtual compute instance of virtual compute service 210), providing virtual block-based storage (e.g., hard disk storage or other persistent storage) as a contiguous set of logical blocks. In some embodiments, as discussed below with regard to FIGS. 3-5, block-based storage service may store data, such as in-memory state for instance(s) 219 as part of implementing hibernation for an instance.

Generally speaking, clients 250 may encompass any type of client configurable to submit network-based requests to provider network 200 via network 260, including requests for storage services (e.g., a request to create a replication job in migration service 230, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on a data storage service (e.g., a block-based storage service 220). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Figure 3:
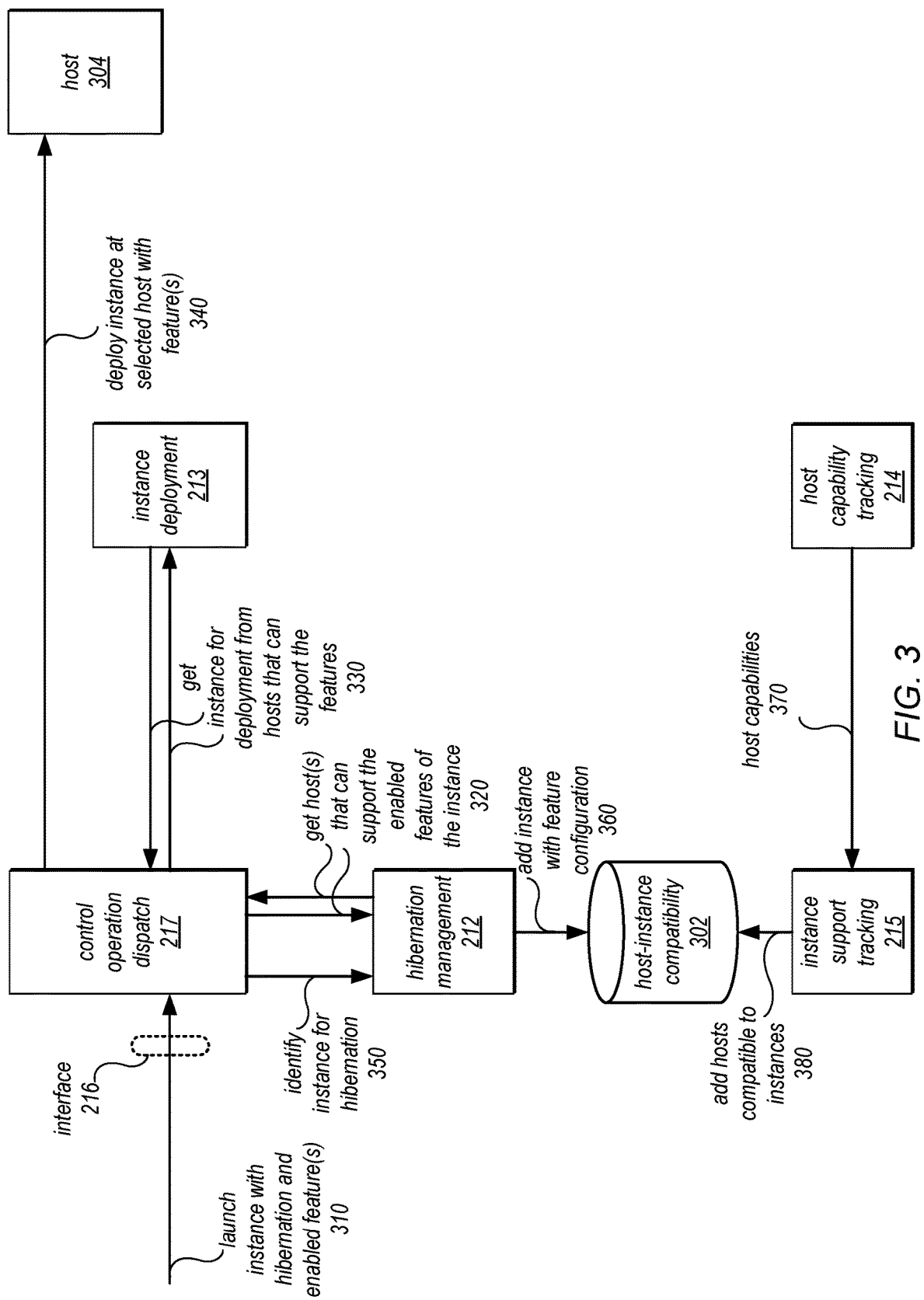
FIG. 3 is a logical block diagram illustrating an example start instance request, according to some embodiments.

FIG. 3 is a logical block diagram illustrating an example start instance request, according to some embodiments. As indicated at 310, a request to launch an instance an instance with hibernation and enabled feature(s) may be received via interface 216 at control operation dispatch 217. For example, hibernation (which may also be referred to as suspend-to-disk) may refer to the saving of instance state information, such as the contents of its memory pages and any running applications, such that the instance can be resumed at a later time with the same state as it had when it was stopped. Control operation dispatch 217 may also identify the instance for hibernation, as indicated at 350. For example, hibernation management 212 may be able to translate, encode, or otherwise represent the features of the instance (e.g., as specified in the start request) according to a schema, as well as other configuration information for the virtual compute instance, such as hardware type for the virtual compute instance, hypervisor or other virtualization management version information, kernel or other operating system version. For example, an instance feature configuration 360 that may be added to host-instance compatibility 302 may be specified using various string and integer combinations. Consider the example instance configuration:

Xen/2.0/processor_size_XYZ/0.1.wd.871.8/
0.6.wd.1128.54.326.metal1.x86_64/5

Each field (or column or value) may be delimited by "/" such that:
Xen→hypervisor type
2.0→instance configuration version number
processor_size_XYZ→HW type
0.1.wd.871.8→hypervisor
0.6.wd.1128.54.325.metal1.x86_64→Kernal type
5→conditional bit map (0101) for enabled features Hibernation management 212 may add the instance with feature configuration 360 to host-instance compatibility 302. Host-instance compatibility 302 may be various types of databases or other indexing structures which may link an instance (e.g., identified according to a identifier for the instance), the instance's configuration (including enabled features), and host systems with configurations that will at least support the instance's configuration, such as a compatibility matrix. Instance support tracking 215 may in various embodiments maintain host-instance compatibility 302 by obtaining host capabilities 370 from host capability tracking 214 and adding the identifiers of host systems and configurations of the hosts to be linked to virtual compute instances that can be supported on the host systems.

In order to analyze compatibility, various comparison rules and operations may be combined, applied, or otherwise performed by instance support tracking 215. For example, instance support tracking 215 can determine support for enabled features by performing bitwise "AND" operations. Consider the following example host systems with corresponding feature configurations:

Host IP=>Feature Configuration
1.2.3.4=>Xen/2/HW1/KER1/5 (101)
1.2.4.5=>Xen/2/HW1/KER1/7 (111)
1.2.3.6==>Xen/2/HW2/KER2/5 (101)
1.2.3.7=>Xen/2/HW2/KER2/5 (101)
1.2.3.8=>Xen/2/HW2/KER2/6 (110)
1.2.3.9==>Xen/2/HW3/KER3/5 (101)
1.2.3.10==>Xen/2/HW3/KER3/I3 (1101)
1.2.3.11==>Xen/2/HW3/KER3/I5 (1111)

In order to determine if a given instance feature configuration (subject) can be supported by a host system's configuration (target), the following techniques may be applied. For instance, in the example above compatibility may be determined by expanding and comparing feature configurations.

Subject feature configuration=>[Target feature configuration]
Xen/2/HW1/KER1=>[Xen/2/HW2/KER2, Xen/2/HW3/KER3]
Expanding Xen/2/HW1/KER1 will return the following:
Xen/2/HW1/KER1/5 (0101)
Xen/2/HW1/KER1/7 (0111)
Expanding Xen/2/HW2/KER2 will return the following:
Xen/2/HW2/KER2/5 (0101)
Xen/2/HW2/KER2/5 (0101)
Xen/2/HW2/KER2/6 (0110)
Expanding Xen/2/HW3/KER3 will return the following:
Xen/2/HW3/KER3/5 (101)
Xen/2/HW3/KER3/13 (1101)
Xen/2/HW3/KER3/15 (1111)
Applying The Rules
Xen/2/HW1/KER1/5 (0101)→
  Xen/2/HW2/KER2/5 (0101) Compatible 0101 & 0101=0101
  Incompatible 0101 & 0110=0100 which isn't 0101
  Xen/2/HW3/KER3/13 (1101) Compatible 1101 & 0101=0101
  Xen/2/HW3/KER3/15 (1111) Compatible 1111 & 0101=0101
Xen/2/HW1/KER1/7 (0111)→
  Incompatible 0111 & 0101=0101 which isn't 0111
  Xen/2/HW3/KER3/15 Compatible 1111 & 0111=0111

Please note that the above techniques provide one example of representing enabled features for compatibility analysis. Other schemas may be utilized in other embodiments.

Control operation dispatch 217 may carry out the deployment of the instance by, for example, getting hosts that can support the enabled features of the instance 320 (e.g., according to the compatible hosts added to the entry in host instance compatibility 302 for that instance. Control operation dispatch 217 may then get an instance 330 for deployment from instance deployment 213 by providing the hosts that can support the enabled features of the instance to instance deployment 213. Instance deployment 213 may apply various host selection techniques (e.g., by applying criteria or other policies that select one host over another (e.g., according to location) from the provided compatible hosts. Control operation dispatch 217 may then cause the instance to be deployed at the selected host 304, as indicated at 340. For example, various instructions, commands, or tasks may be submitted to virtualization management to enable the features (e.g., by setting or enabling different parameters, configuration files, modifying settings, or performing other changes in accordance with the one or more features). An image file or other data to configure the host to start the instance may obtained and loaded in order to start the virtual compute instance. Various network configuration and storage connections may be established (e.g., a connection to mount a virtual block-based data volume stored in block-based storage service 220), as well.

Figure 4:
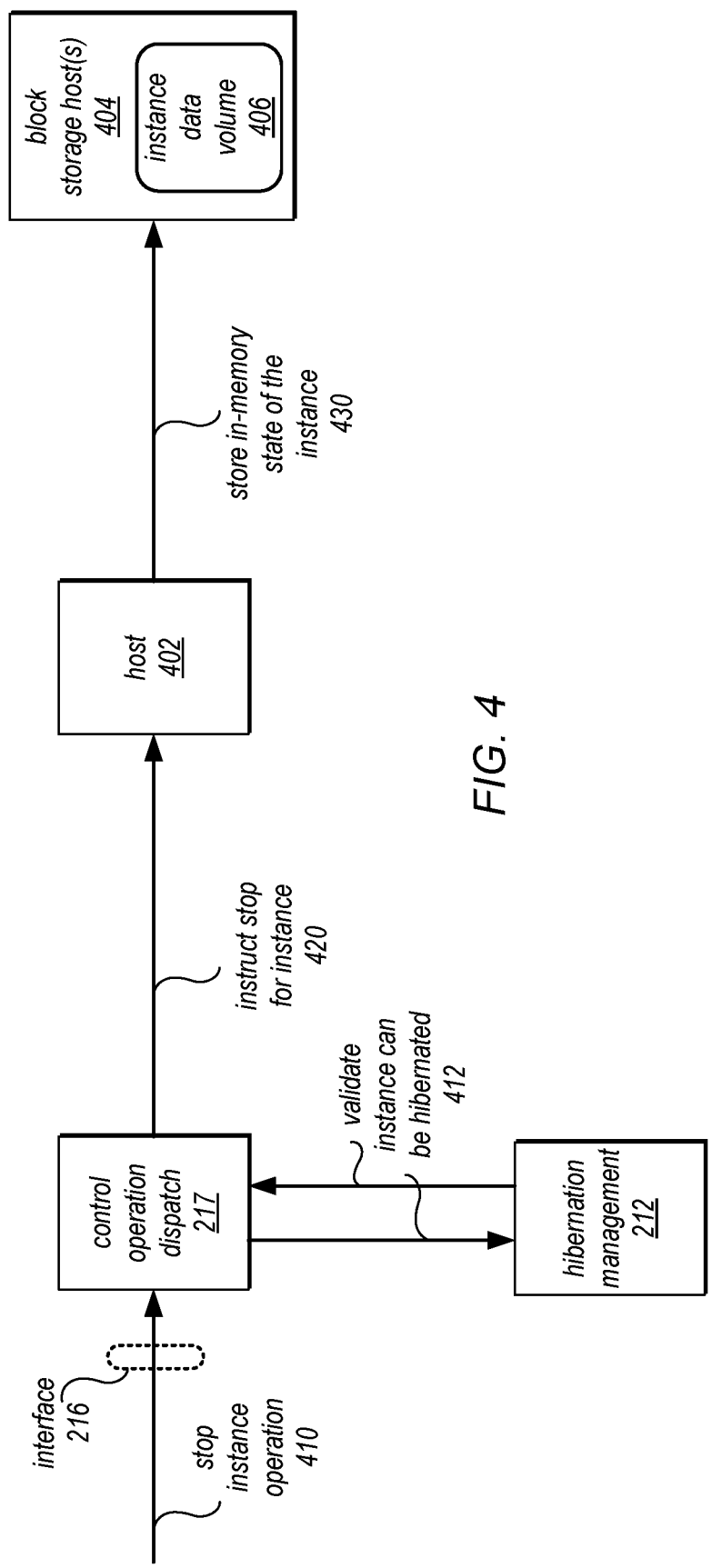
FIG. 4 is a logical block diagram illustrating an example pause instance request, according to some embodiments.

FIG. 4 is a logical block diagram illustrating an example pause instance request, according to some embodiments. A request to stop instance operation may be received via interface 216 as indicated at 410. Control operation dispatch 217 may instruct host 402 to pause the instance (e.g., by sending a sleep, hibernate, or other command to suspend the virtual compute instance). As part of carrying out the command, host 402 may store the in-memory state of the instance 430 to block storage host(s) 404 (which may be implemented as part of block-based storage service 220), which may already store a data volume 406 for the instance. In this way, the in-memory state of the virtual compute instance can be preserved for resuming operation.

Figure 5:
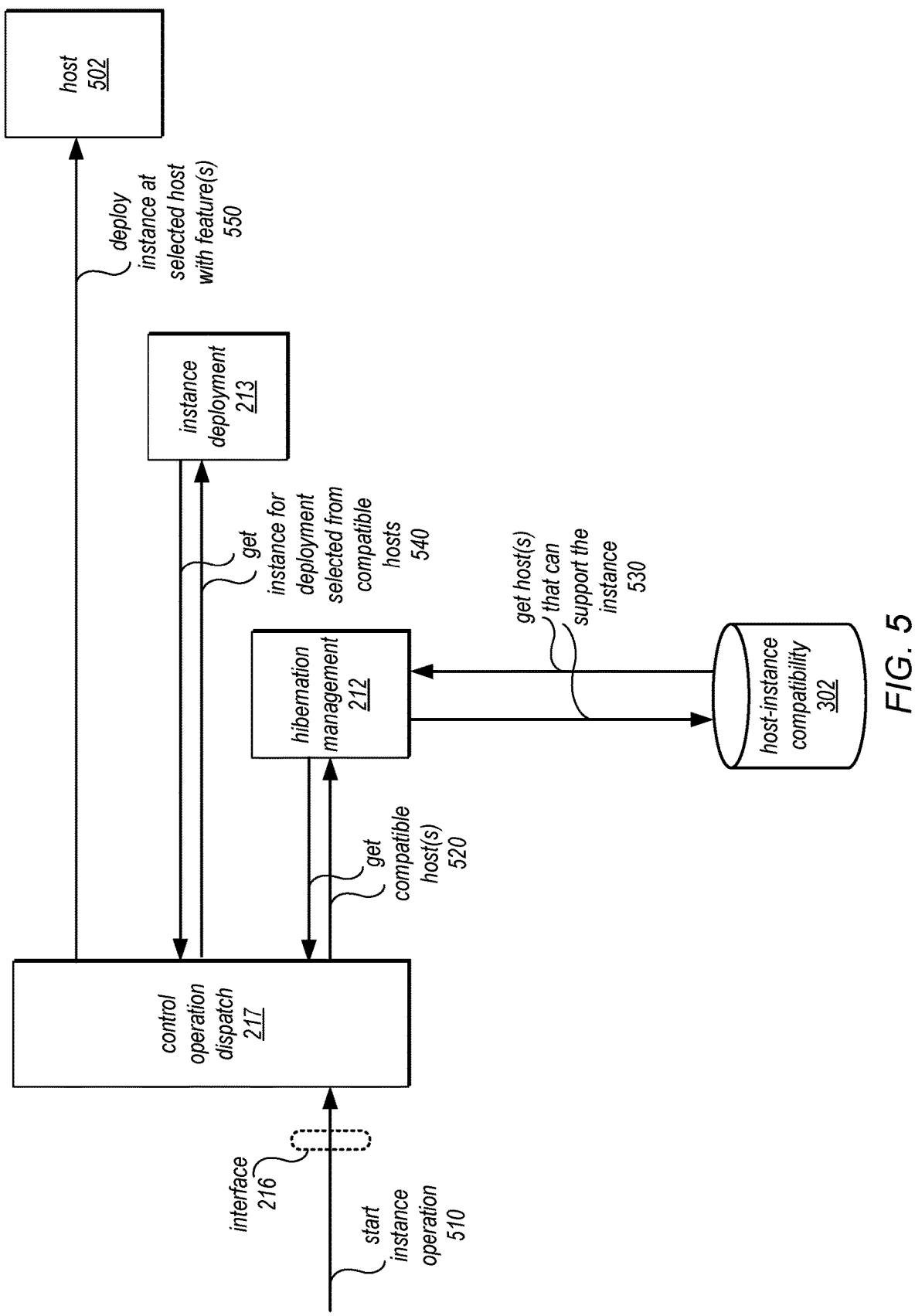
FIG. 5 is a logical block diagram illustrating an example resume instance request, according to some embodiments.

FIG. 5 is a logical block diagram illustrating an example start instance request, according to some embodiments. A start instance operation 510 may be received via interface 216. Control operation dispatch 217 may request hibernation management to get compatible host(s) 520 for the instance. Hibernation management 212 may access host-instance compatibility 302 and obtain a list of host(s), as indicated at 530, that can support the features of the instance. Hibernation management 212 may then provide the compatible host(s) and enabled feature(s) for the instance to control operation dispatch 217. Control operation dispatch 217 may then get an instance for deployment selected from compatible hosts, as indicated at 540, from instance deployment 213. Instance deployment 213 may apply various selecting techniques or schemes (which may apply additional criteria to those compatible host(s) in in order to select a host, such as host 502, to deploy the instance).

Figure 6:
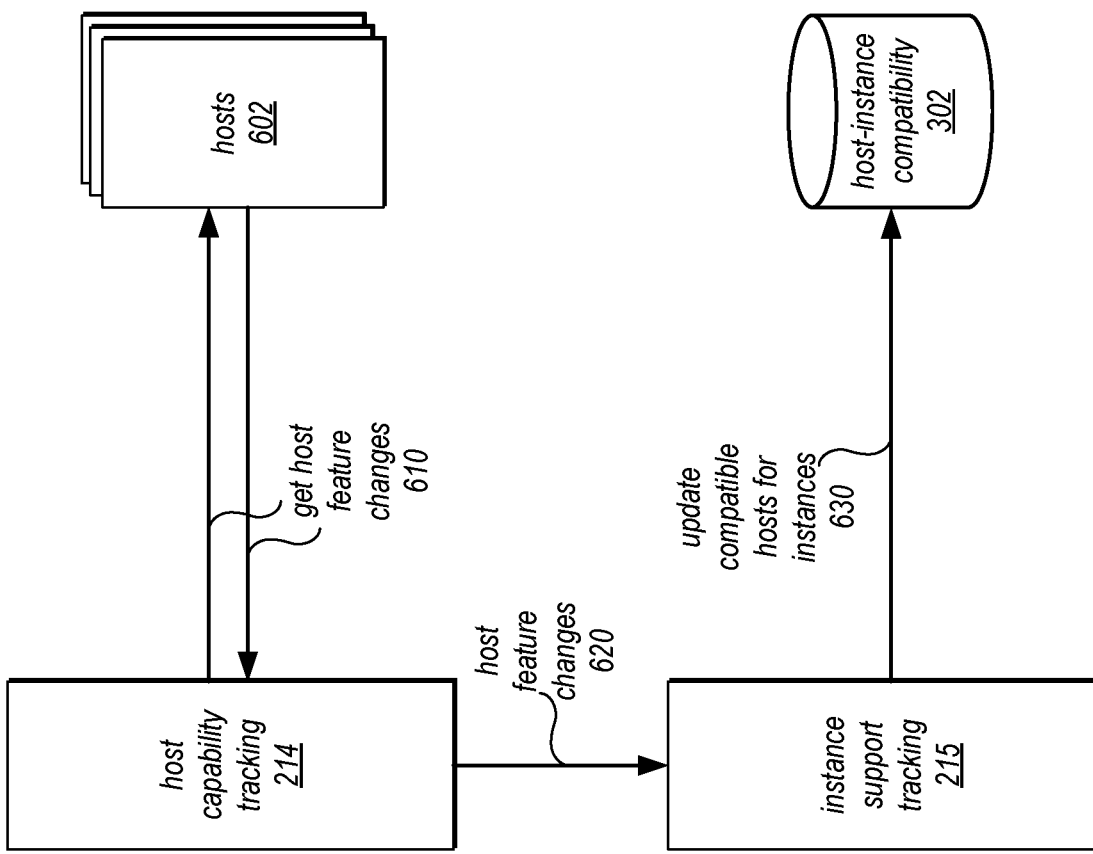
FIG. 6 is a logical block diagram illustrating updates to compatible hosts for virtual compute instances for changes to supported features, according to some embodiments.

As indicated at 550, control operation dispatch 217 may then deploy the instance at selected host 502 with the enabled feature(s). In some embodiments, instance deployment 213 may try multiple provided compatible host(s) until a host, such as host 502, is able to accept the deployment (e.g., in scenarios where capacity to accept an instance may have changed). Deploying an instance at host 502 may include various instructions, commands, or tasks may be submitted to virtualization management to enable the features (e.g., by setting or enabling different parameters, configuration files, modifying settings, or performing other changes in accordance with the one or more features). The in-memory state of the virtual compute instance, as well as any other information used to resume operation of the virtual compute instance (e.g., including information describing various network connections or other external dependencies of the virtual compute instance to be reestablished) may be obtained (e.g., from a data store, such as a data volume stored in a block-based storage service like block-based storage service 220). The in-state memory may be loaded into a memory of the identified host system, various reconnections and other reestablishment operations completed, and processes of the virtual compute instance may be resumed Support for different features may change over time. New features may be added, or support for some features may be removed. In order to adapt to these changes in features support, the capability of hosts and their corresponding compatibility to virtual compute instances that may be (or are) paused, can be updated. FIG. 6 is a logical block diagram illustrating updates to compatible hosts for virtual compute instances for changes to supported features, according to some embodiments.

As indicated at 610, host feature changes 610 may be obtained from different hosts 602 by host capability tracking 214. For example, various polling techniques or mechanisms may periodically sweep through the supported features of hosts 602 to report any changes or additions to the number of supported features. In some embodiments (not illustrated) host capability tracking 214 may be notified of changes in features support by another control plane component, and may begin to request host feature changes 610.

As indicated at 620, the host feature changes may be provided to instance support tracking 215. As discussed above with regard to FIG. 3, instance support tracking 215 may maintain host-instance compatibility 302. Instance support tracking 215 may be able to update the compatibility of hosts for instances, as indicated at 630 to reflect the changes in host support for features. For example, instance support tracking 215 may be able to modify existing host capabilities (e.g., host bitmaps) to add a new feature (e.g., by adding the corresponding field in the bitmap). In some scenarios, adding a new feature may to a host system may cause that host system to become compatible with currently tracked instance. Thus, instance support tracking 215 may also update the list of compatible hosts with a particular compute instance (e.g., as a host that was not compatible before the addition is now compatible with an instance after the addition of the new feature).

Figure 7:
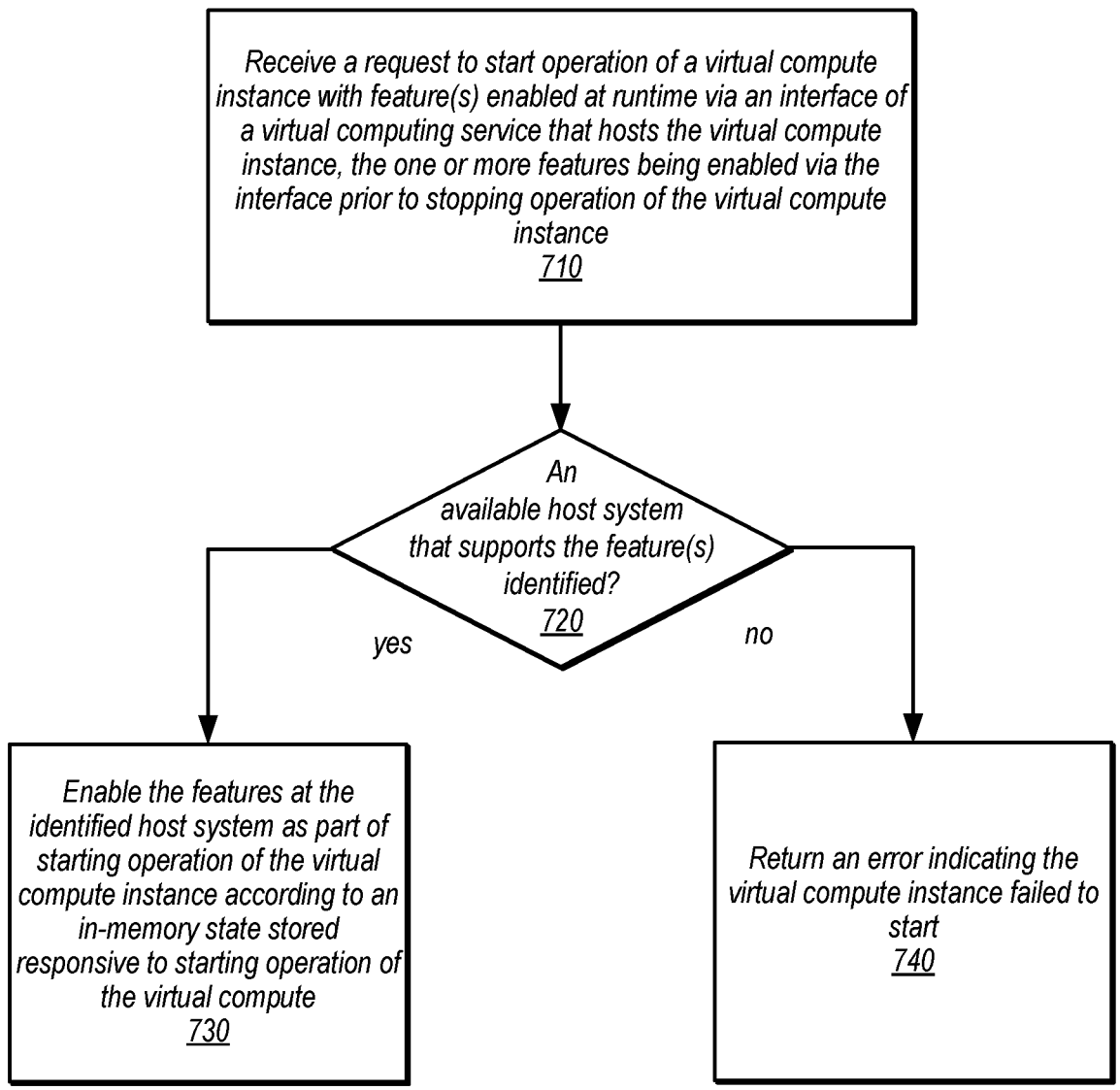
FIG. 7 is a high-level flowchart illustrating techniques and methods to implement identifying hosts for dynamically enabling specified features when resuming operation of a virtual compute instance according to some embodiments.

The examples of identifying hosts for dynamically enabling specified features when resuming operation of a virtual compute instance discussed above with regard to FIGS. 2-6 have been given in regard to one example of a provider network, virtual computing service, and block-based storage service. Various other types of virtual compute instances and virtual computing services (e.g., with different control plane implementations) may implement these techniques. FIG. 7 is a high-level flowchart illustrating techniques and methods to implement identifying hosts for dynamically enabling specified features when resuming operation of a virtual compute instance according to some embodiments. These techniques, as well as the techniques of FIGS. 8-9 described below, may be implemented using various components of a provider network as described above with regard to FIGS. 2-6 or other types or systems implementing a provider network.

As indicated at 710, a request may be received to start operation of a virtual compute instance with one or more feature(s) enabled at runtime via an interface of a virtual computing service that hosts the virtual compute instance, in some embodiments. The request, which may be received via various types of interfaces (e.g., command line, GUI, and/or API) may identify the virtual compute instance to start or otherwise resume according to an identifier, such as a name or location (e.g., network address). The request to start operation may, in some embodiments, be validated prior to being performed. For example, metadata describing virtual compute instances may be checked to identify that the virtual compute instance is in a stopped state (e.g., as opposed to having been "shutdown").

As indicated at 720, an attempt to identify an available host system that supports the one or more features may be made, in various embodiments. For example, as discussed above with regard to FIG. 5, a feature configuration or other data item may be used to filter out available host systems that do not support the one or more features. In some embodiments, available host systems (or available host system configurations) that support the one or more features may be determined prior to the resume request (e.g., when a stop is requested or when a request to launch the virtual compute instance is received). These available host systems that support the one or more features may be periodically updated, as discussed above, in order to quickly identify an available host system that supports the one or more features when a start operation is received, in some embodiments. As discussed above, a bitmap or other encoding of supported and enabled features may be utilized to identify and enable features for the virtual compute instance. In at least some embodiments, additional criteria may be used to identify the host system. For example, various criteria for optimizing placement of a virtual compute instance (e.g., at a location that is close to other resources utilized by the virtual compute instance, such as a server in a same data center as a storage server that provides access to a data volume used by the virtual compute instance, that provides a "best fit" for the supported features by not supporting features that are not enabled, etc. . . . ) may also be applied (e.g., to distinguish between selecting different hosts that both support the virtual compute instance).

As indicated at 730, if a host system is identified, then the one or more features may be enabled at the identified host system as part of resuming operation of the virtual compute instance according to an in-memory state stored response to stopping operation of the virtual compute instance, in some embodiments. For example, various instructions, commands, or tasks may be submitted to virtualization management to enable the features (e.g., by setting or enabling different parameters, configuration files, modifying settings, or performing other changes in accordance with the one or more features). The in-memory state of the virtual compute instance, as well as any other information used to start operation of the virtual compute instance (e.g., including information describing various network connections or other external dependencies of the virtual compute instance to be reestablished) may be obtained (e.g., from a data store, such as a data volume stored in a block-based storage service like block-based storage service 220). The in-state memory may be loaded into a memory of the identified host system, various reconnections and other reestablishment operations completed, and processes of the virtual compute instance may be resumed.

It may be the case that in some scenarios, an available host system that supports the one or more features may not be identified. In such scenarios an error may be returned indication that the virtual compute instance failed to resume, as indicated at 740. In some embodiments, various retries or other attempts to obtain an available host system (e.g., by provisioning or reconfiguring a host system to support the one or more features) may be performed.

Figure 8:
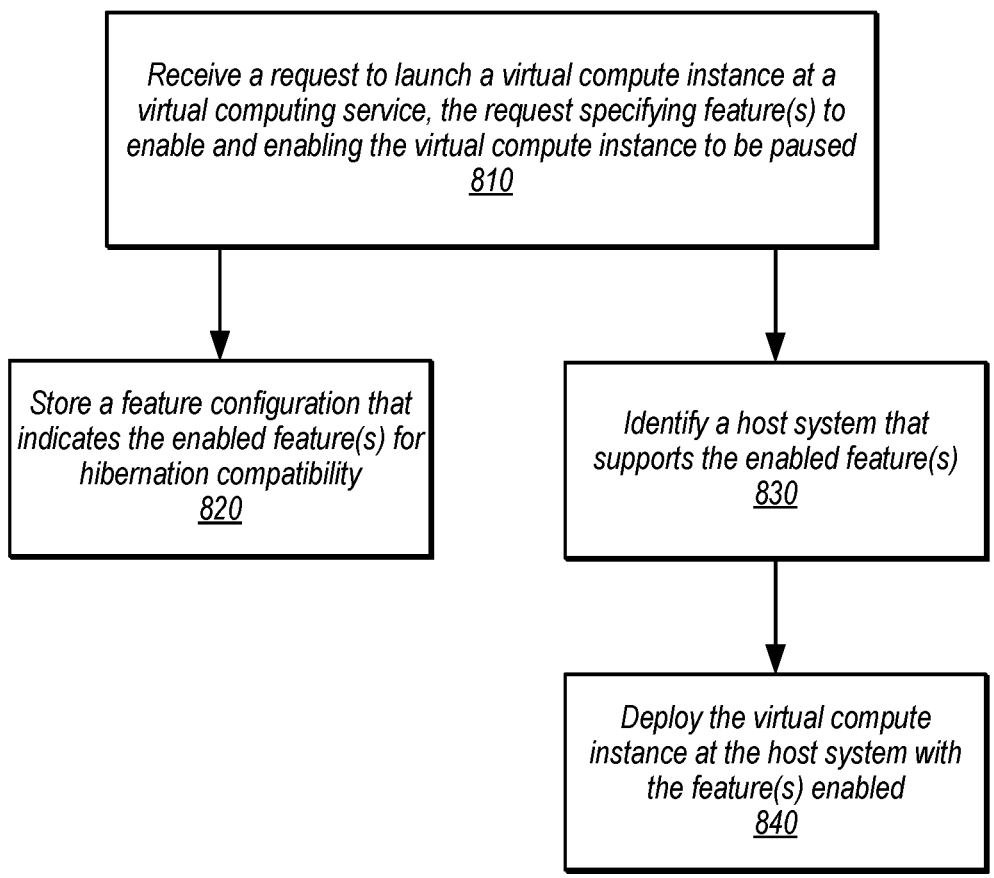
FIG. 8 is a high-level flowchart illustrating techniques and methods to implement launching a virtual compute instance with enabled features and hibernation, according to some embodiments.

FIG. 8 is a high-level flowchart illustrating techniques and methods to implement launching a virtual compute instance with enabled features and hibernation, according to some embodiments. As indicated at 810, a request may be received to launch a virtual compute instance at a virtual computing service, in some embodiments. The request, which may be received via various types of interfaces (e.g., command line, GUI, and/or API) may identify the virtual compute instance to start according to an identifier, such as a name or location (e.g., network address). The request may also specify whether (or not) the virtual compute instance can be stopped (e.g., a hibernation setting). The request may also specify one or more features of the virtual compute instance to enabled. As discussed above, these features may include various operating system, application, or other software patches, driver versions, configuration parameters, optimizations, packages, among others. The request to start operation may, in some embodiments, be validated prior to being performed. For example, the validity of the specified features in the request may be checked.

As indicated at 820, a feature configuration may be stored that indicates the enabled features for hibernation compatibility, in some embodiments. For example, a conditional bitmap may be utilized, as discussed above, wherein individual features are represented as different locations in the bitmap and "1" values indicate an enabled feature (and "0" indicate a disabled/"don't care" value for features). The stored feature configuration may be used to proactively obtain compatible host systems that support the enabled features of the virtual compute instance, as discussed above with regard to FIGS. 3 and 6.

As indicated at 830, a host system may be identified that supports the enabled feature(s). Then, as indicated at 840, the virtual compute instance may be deployed at the host system with the feature(s) enabled. For instance, different configuration parameters, settings, or values may be modified to enable the specified features in the request to start the virtual compute instance.

Figure 9:
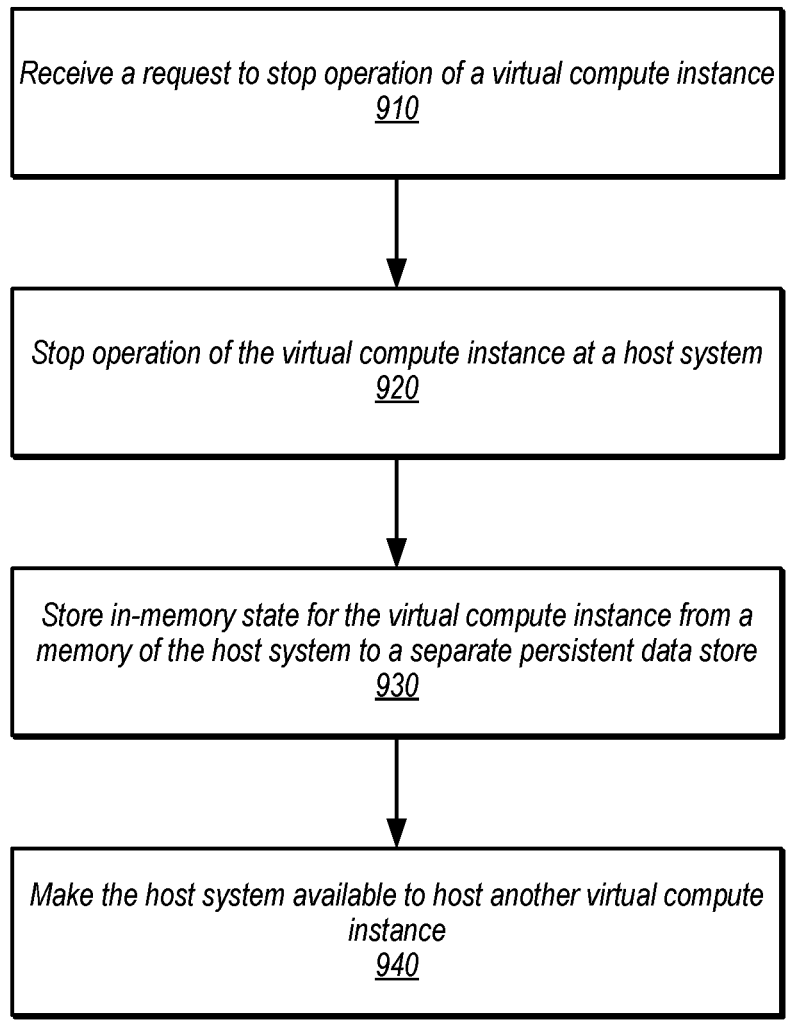
FIG. 9 is a high-level flowchart illustrating techniques and methods to implement stopping operation of a virtual compute instance, according to some embodiments.

FIG. 9 is a high-level flowchart illustrating techniques and methods to implement stopping operation of a virtual compute instance, according to some embodiments. As indicated at 910, a request to stop operation of a virtual compute instance may be received, in some embodiments. The request, which may be received via various types of interfaces (e.g., command line, GUI, and/or API) may identify the virtual compute instance to stop according to an identifier, such as a name or location (e.g., network address). The request to stop or otherwise pause operation may, in some embodiments, be validated prior to being performed. For example, metadata describing virtual compute instances may be checked to identify that the virtual compute instance was started with stopping capability enabled.

As indicated at 920, operation of the virtual compute instance may be stopped at a host system, in some embodiments. For example, a sleep, suspend, hibernate or other command or instruction may be sent to virtualization management (e.g., a hypervisor) which may cause the operation to pause. As indicated at 930, in-memory state for the virtual compute instance may be stored from a memory of the host system to a separate persistent data store, in some embodiments. For example, network attached storage, which may store other data utilized by the virtual compute instance, such as data volume, image, or other configuration information may be used to store the in-memory state of the virtual compute instance. As indicated at 940, the host system may be made available to host another virtual compute instance, in some embodiments. For example, a capacity tracker, resource pool, or other host management mechanism for a virtual computing service may be updated to indicate the availability of the host. As host systems may be multi-tenant, in some scenarios another virtual compute instance may not be placed on the host system (e.g., according to the utilization of the host system by other virtual compute instances that remain on the host system).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 10:
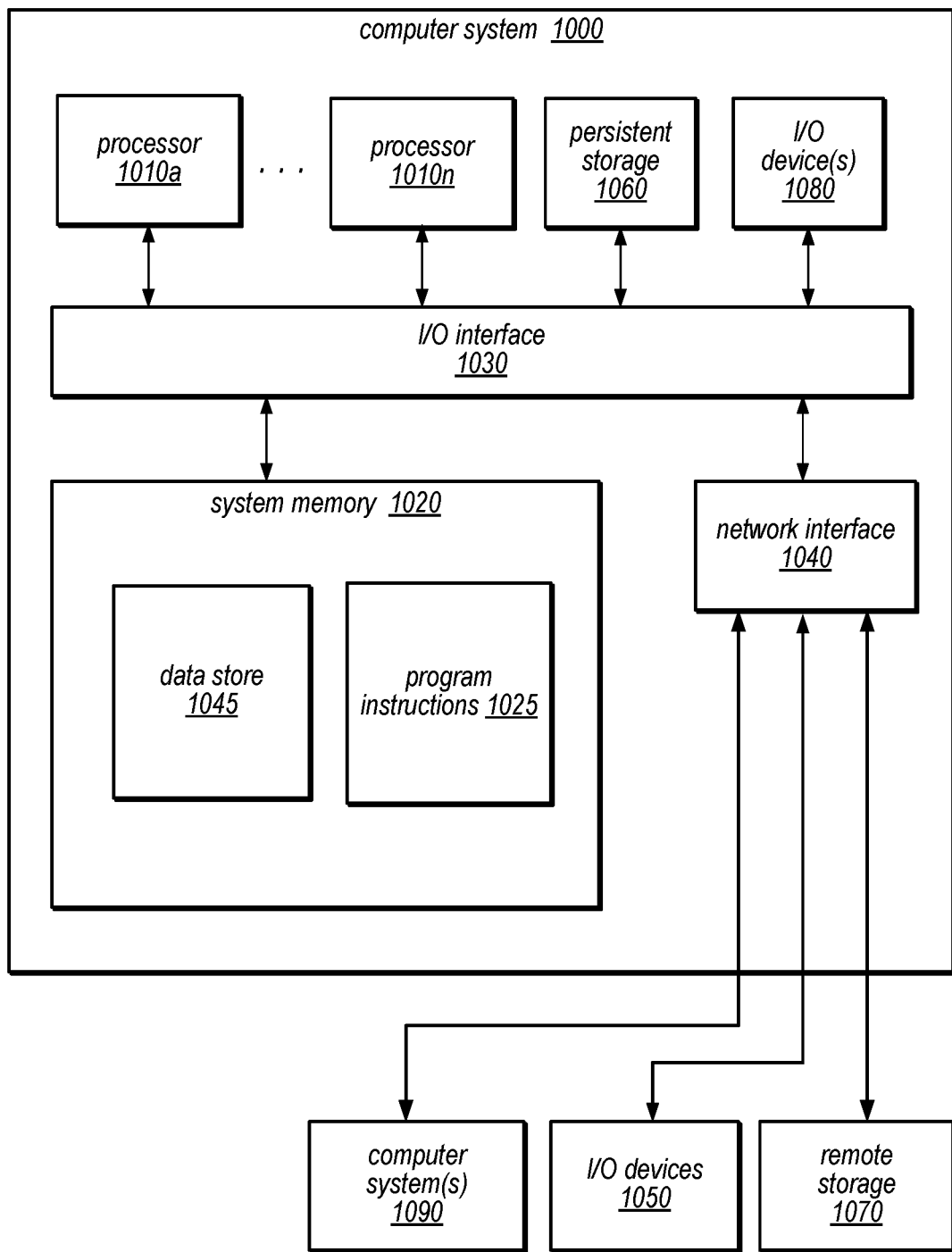
FIG. 10 is a block diagram illustrating an example computing system, according to some embodiments.

Identifying hosts for dynamically enabling specified features when resuming operation of a virtual compute instance as described herein may be executed on one or more computer systems, which may interact with various other devices. FIG. 10 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a control plane for a virtual compute service, wherein the control plane comprises at least one processor and a memory, and wherein the control plane is configured to:
receive a request to start operation of a virtual compute instance that was previously running on a first host system of the virtual compute service;
identify one or more features that were previously enabled at runtime as specified in a request received via an interface of the virtual computing service, wherein enablement of the one or more features provided a customized execution environment for the virtual compute instance at the first host system, and wherein the one or more features were enabled via the interface prior to stopping operation of the virtual compute instance;
select, from a plurality of available host systems for the virtual compute instance, a second host system that supports at least the one or more features;
cause the one or more features that were previously enabled at runtime at the first host system and are currently disabled at the second host system to be enabled at the second host system, providing the same customized execution environment at the second host system for the virtual compute instance; and
cause operation of the virtual compute instance to start at the second host system according to an in-memory state stored responsive to stopping operation of the virtual compute instance.

2. The system of claim 1, wherein the control plane is further configured to:
receive a request to launch the virtual compute instance at the virtual computing service via the interface, wherein the request to launch the virtual compute instance is the request that specifies the one or more features to be enabled for the virtual compute instance; and
store a feature configuration that indicates the one or more features for the virtual compute instance, wherein the causation of the one or more features at the identified host system to be enabled is based on the stored feature configuration.

3. The system of claim 1, wherein to select, from the plurality of available host systems for the virtual compute instance, the second host system that supports at least the one or more features, the control plane is configured to access host-instance compatibility data for the virtual compute instance that identifies one or more host systems, including the second host system as supporting at least the one or more features.

4. The system of claim 1, wherein the virtual computing service is offered as part of a provider network, wherein the in-memory data is stored in a block-based storage service offered as part of the provider network, and wherein the request to start the virtual compute instance specifies enables the virtual compute instance to be paused.

5. A method, comprising:
receiving a request to start operation of a virtual compute instance with one or more features that were previously enabled at runtime as specified in a prior request received via an interface of a virtual computing service that hosts the virtual compute instance, wherein enablement of the one or more features provided a customized execution environment for the virtual compute instance at a first host system, and wherein the one or more features were enabled via the interface prior to stopping operation of the virtual compute instance at the first host system;
identifying, from a plurality of available host systems for the virtual compute instance, a second host system that supports at least the one or more features; and
enabling the one or more features at the second host system as part of starting operation of the virtual compute instance according to an in-memory state stored responsive to stopping operation of the virtual compute instance, wherein enabling the one or more features at the second host system that were previously enabled at runtime at the first host system and are currently disabled at the second host system provides the same customized execution environment at the second host system for the virtual compute instance.

6. The method of claim 5, further comprising:
receiving a request to launch the virtual compute instance at the virtual computing service via the interface, wherein the request to launch the virtual compute instance is the prior request that specifies the one or more features to be enabled for the virtual compute instance; and
storing a feature configuration that indicates the one or more features for the virtual compute instance, wherein enabling the one or more features at the identified host system is based on the stored feature configuration.

7. The method of claim 5, wherein identifying, from the plurality of available host systems for the virtual compute instance, the second host system that supports at least the one or more features, further comprises accessing host-instance compatibility data for the virtual compute instance that identifies one or more host systems, including the second host system as supporting at least the one or more features.

8. The method of claim 7, wherein the host-instance compatibility data for the virtual compute instance is generated by obtaining host capabilities from the plurality of available host systems and filtering out according to one or more compatibility rules those host systems that do not support the at least one or more features.

9. The method of claim 8, wherein the host-instance compatibility data represents the one or more features enabled for the virtual compute instance as a bitmap, and wherein filtering out according to one or more compatibility rules those host systems that do not support the at least one or more features comprises performing a bitwise AND operation on the bitmap for the virtual compute instance and respective bitmaps for features supported by the plurality of available host systems.

10. The method of claim 5, wherein the second host system supports one or more other features that are not enabled for the virtual compute instance.

11. The method of claim 5, wherein a request to launch the virtual compute instance received via the interface enables the virtual compute instance to be stopped.

12. The method of claim 5, further comprising:
receiving a request to stop the virtual compute instance at the first host system;
storing the in-memory state from a memory of the first host system to a persistent data store separate from the current host system; and
making the first host system available to host a different virtual compute instance.

13. The method of claim 5, further comprising:
receiving a request to start operation of a different virtual compute instance with at least one feature enabled at runtime via the interface;
failing to identify, from the plurality of available host systems for the virtual compute instance, a host system that supports the at least one feature; and
returning an error indicating that the different virtual compute instance failed to start.

14. One or more non-transitory, computer-readable storage media, storing program instructions that when executed on or across one or more computing devices cause the one or more computing devices to implement:
receiving a request to start operation of a virtual compute instance at a virtual compute service;
identifying one or more features that were previously enabled as specified in a prior request received at runtime via an interface of the virtual computing service, wherein enablement of the one or more features provided a customized execution environment for the virtual compute instance at the first host system, and wherein the one or more features were enabled via the interface prior to stopping operation of the virtual compute instance;
selecting, from a plurality of available host systems for the virtual compute instance, a second host system that supports at least the one or more features;
enabling the one or more features at the second host system, wherein enabling the one or more features at the second host system that were previously enabled at runtime at the first host system and are currently disabled at the second host system provides the same customized execution environment at the second host system for the virtual compute instance; and
resuming operation of the virtual compute instance at the selected host system according to an in-memory state stored responsive to stopping operation of the virtual compute instance.

15. The one or more non-transitory, computer-readable storage media of claim 14, storing further instructions that when executed on or across the one or more computing devices cause the one or more computing devices to further implement:

receiving a request to launch the virtual compute instance at the virtual computing service, wherein the request to launch the virtual compute instance is the prior request that specifies the one or more features to be enabled for the virtual compute instance; and storing a feature configuration that indicates the one or more features for the virtual compute instance, wherein enabling the one or more features at the identified host system is based on the stored feature configuration.

16. The one or more non-transitory, computer-readable storage media of claim 14, wherein in selecting, from the plurality of available host systems for the virtual compute instance, the second host system that supports at least the one or more features, the program instructions cause the one or more computing devices to implement accessing host-instance compatibility data for the virtual compute instance that identifies one or more host systems, including the second host system as supporting at least the one or more features.

17. The one or more non-transitory, computer-readable storage media of claim 16, wherein the host-instance compatibility data for the virtual compute instance is updated after obtaining a host capability for the second host system to include the second host system in the host-instance compatibility data for the virtual compute instance.

18. The one or more non-transitory, computer-readable storage media of claim 17, wherein the host-instance compatibility data represents the one or more features enabled for the virtual compute instance as a bitmap, and wherein a determination that the host capability for the virtual compute instance supports the one or more features is based on a result of a bitwise AND operation performed on the bitmap for the virtual compute instance and a bitmap for features supported by the second host system.

19. The one or more non-transitory, computer-readable storage media of claim 14, storing further instructions that when executed on or across the one or more computing devices cause the one or more computing devices to further implement:

receiving a request to stop the virtual compute instance at the first host system;

storing the in-memory state from a memory of the current host system to a persistent data store separate from the first host system; and making the first host system available to host a different virtual compute instance.

20. The one or more non-transitory, computer-readable storage media of claim 14, wherein the virtual computing service is offered as part of a provider network, wherein the in-memory data is stored in a block-based storage service offered as part of the provider network, and wherein a request to start the virtual compute instance specifies enables the virtual compute instance to be paused.

* * * * *